March 9, 1948.   R. B. BOURNE   2,437,291
SNOW PLOW
Filed May 20, 1946   3 Sheets-Sheet 3
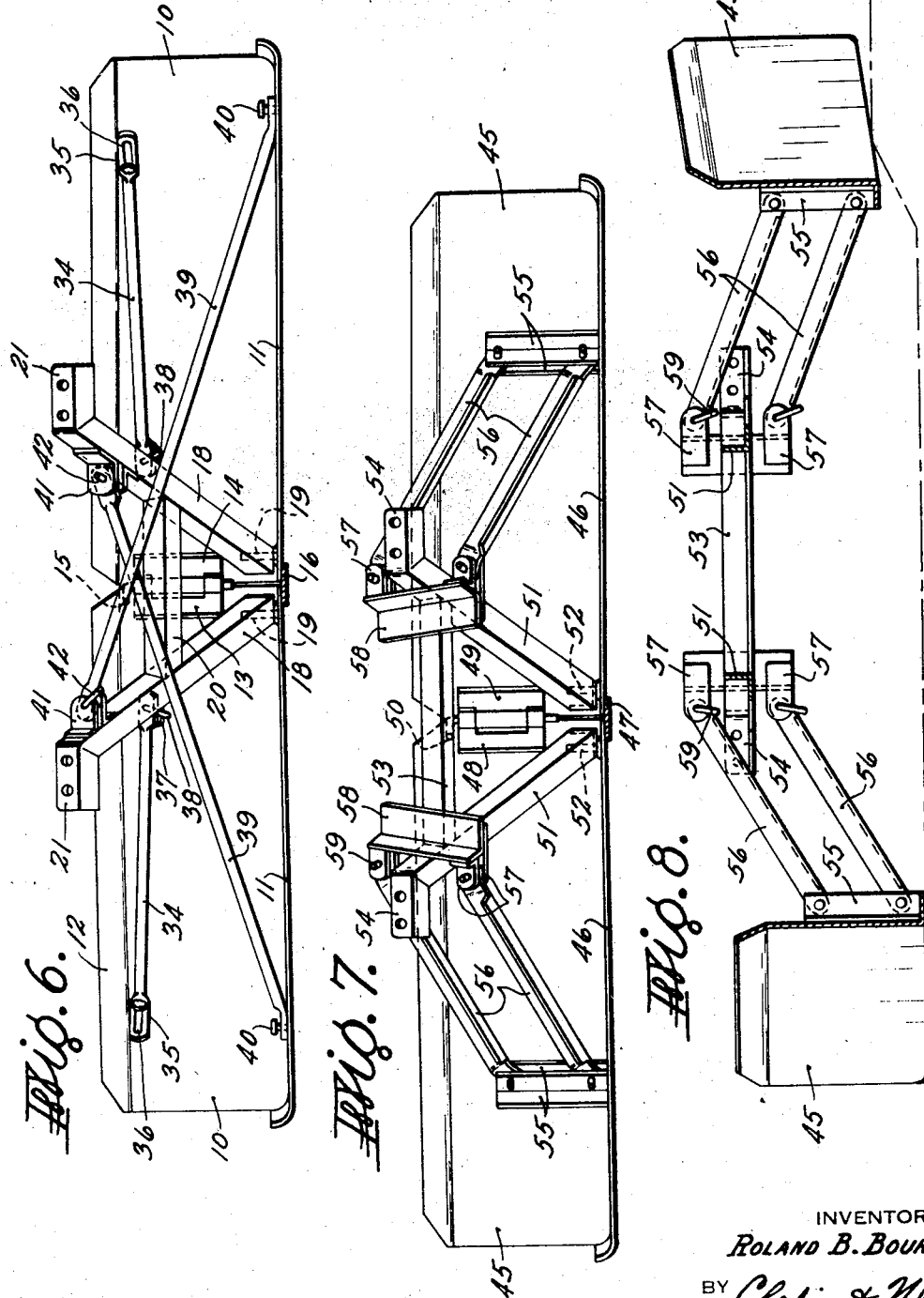
INVENTOR
ROLAND B. BOURNE
BY Chapin & Neal
ATTORNEYS Patented Mar. 9, 1948

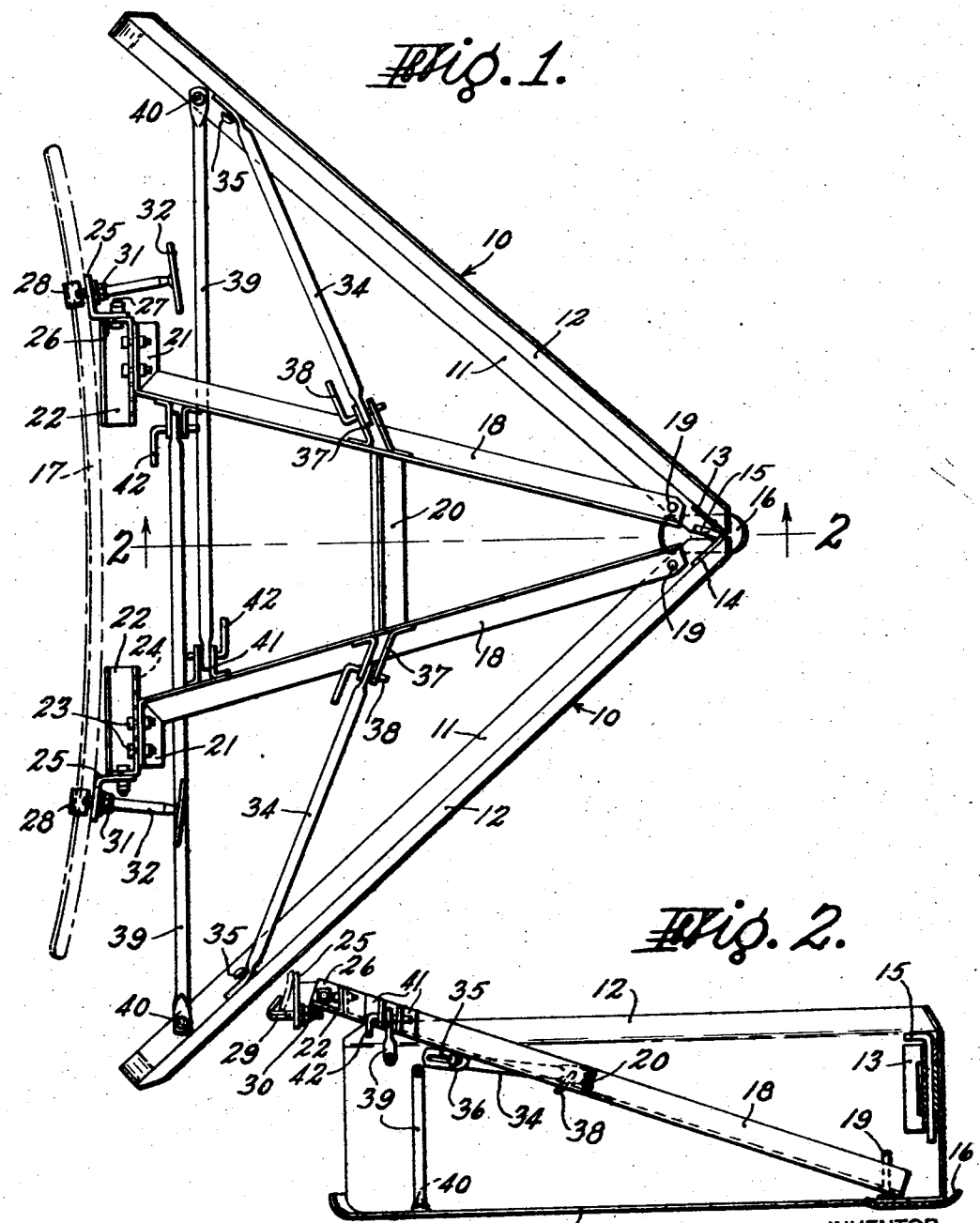

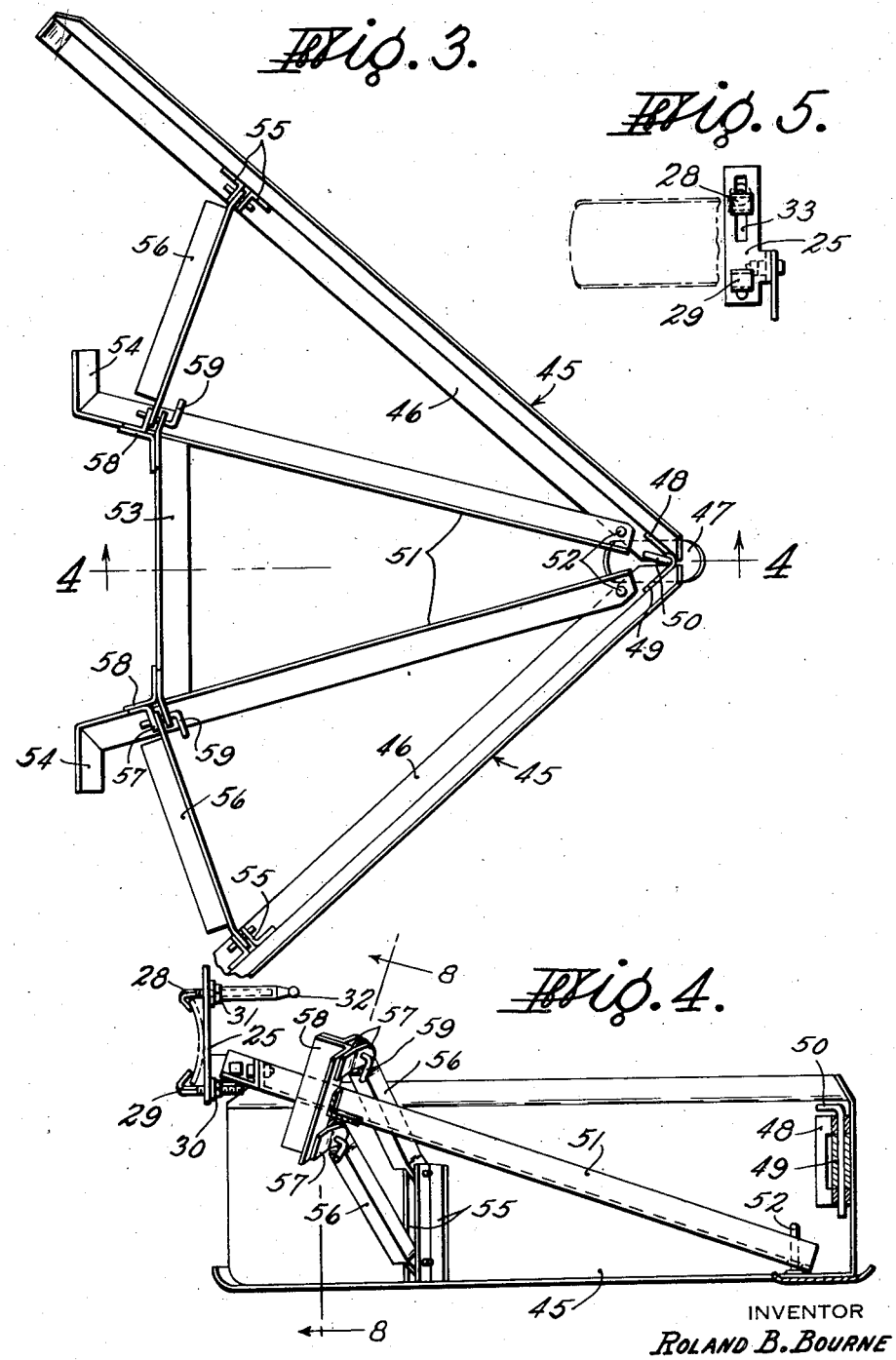

2,437,291

UNITED STATES PATENT OFFICE 2,437,291

SNOWPLOW

Roland B. Bourne, West Hartford, Conn., assignor to The Maxim Silencer Company, Hartford, Conn., a corporation of Connecticut Application May 20, 1946, Serial No. 670,875

7 Claims. (Cl. 37—44)

This invention relates to snow plows, particularly such as are adapted to be connected to the bumpers of automobiles of the pleasure type. Such plows are generally used for plowing private driveways and the like, which generally include sloping portions such as ramps or aprons connecting them with the street and which are frequently irregular or curved so that one side or the other of the plow is given a tendency to lift due either to elevation of the ground or to pressure of the snow. So much of this tendency to lift as is caused by the snow pressure can be resisted by making the connection to the bumper so rigid laterally that the plow cannot tilt without tilting the automobile with it, but the very rigidity of this connection prevents the plow from accommodating itself to the irregularity of the ground.

It is the object of this invention to provide a plow construction by which the moldboards of the plow are permitted to follow irregularities in the ground surface, but are prevented from being raised by excess pressure of the snow at one side. The manner in which this object is accomplished will be described with reference to the accompanying drawings, in which, Fig. 1 is a tap plan of one form of plow;

Fig. 2 is a section on line 2—2 of Fig. 1;

Fig. 3 is a top plan of a second form with the pushing frame lowered;

Fig. 4 is a section on line 4—4 of Fig. 3 with the pushing frame raised to the bumper;

Fig. 5 is a detail of one of the bumper clamps;

Fig. 6 is a rear view of the form of Fig. 1, with the bumper clamps removed;

Fig. 7 is a similar view of the form of Fig. 3; and

Fig. 8 is a section on line 8—8 of Fig. 4 showing one side of the plow riding over a high spot.

The form shown in Figs. 1, 2 and 6 comprises a pair of moldboards 10 each having its bottom edge turned under at 11 to form a runner and its top flared outwardly at 12 to form a deflector for the snow. These upper and lower bent portions also act as strengthening members for the moldboards. The two moldboards have hinge plates 13 and 14 welded to the ends of their inner surfaces, through the eyes of which passes a removable pin 15 having its upper end bent over to serve both as a handle and a stop. The moldboards thus have a limited pivotal movement for a purpose which will be explained. A shoe 16 is preferably welded to one only of the moldboards, so as not to interfere with this pivotal movement, and has its front and rear ends upcurved so as to facilitate the passage of the plow over obstructions and prevent it digging into a soft driveway.

The thrust for pushing the plow is derived from the bumper 17 of an automobile through a triangular frame the side members 18 of which have holes to permit them being slipped over pins 19 welded to the runner portions 11 of the moldboards. The members 18 may if desired be connected together by a strut 20. The rear ends of members 18 are provided with any suitable form of clamp for attachment to an automobile, preferably to the bumper. As shown, the angles 18 are bent outwardly at 21 as by cutting out a V-shaped notch in the lower web of the angle and welding after bending. To the vertical web of the angle a short angle 22 may be secured as by bolts 23, the angle 22 being provided with a plurality of bolt receiving holes 24 for adjustability. A clamp bracket 25 is held to the bent-over end 26 of the angle 22 by a pivot bolt 27, and, as best shown in Figs. 1, 4, and 5, carries upper and lower pairs of clamp hooks 28 and 29, threaded at one end and adapted to engage over the upper and lower edges of the bumper 17. Hooks 28 and 29 extend through openings in bracket 25 and are rotatable so that the hook end can be swung into engagement with the rear side of the car bumper. The lower hooks 29 are held in clamping position by nuts 30 while the upper hooks 28 are drawn into clamping engagement by socket nuts 31 having handles 32 to facilitate connecting and disconnecting the clamps and bumper. Each upper hook 38 operates in an elongated slot 33 in bracket 25 to permit adjustment to different sizes of bumper.

The rear end portions of the moldboards are connected to the adjacent members 18 by link rods 34. The outer ends of rods 34 are loosely connected to the moldboards, adjacent the upper edges of the latter (Figs. 1 and 2), by headed pins 35 secured to the moldboards and extending through slots 36 in the rods to provide a universal connection between the rods and moldboards. The inner ends of rods 34 are loosely pivoted for movement in a vertical plane in brackets 37, welded to the members 18 opposite the ends of strut 20, by removable pivot pins 38.

Each moldboard is connected to the non-adjacent member 18 by link rods 39 loosely pivoted at their outer ends to the bottom runner 11 of the moldboard, adjacent the rear end of the latter, by means of headed pins 40. The inner ends of the rods 39 are loosely pivoted by removable pivot pins 42, for movement in a vertical plane in brackets 41, which brackets are welded to the members 18.

Considering the operation of the form above described, it will be seen that the forward operating thrust from the car bumper is carried directly to the nose of the plow at the forward end of the runners 11 by the members 18 of the A-frame. The thrust is thus applied adjacent the lower end of the vertical hinge of the moldboards. The side thrust on the moldboards is transmitted from the top of the moldboards to the A-frame by links 34 and from the bottom of the moldboards by links 39. The thrust of links 34 tends to compress the members 18 together while due to the crossover arrangement of links 39 the thrust of links 34 tends to spread the members 18. The crossing of links 39 and the slotted connection of links 34 to the moldboard permits a limited degree of relative twisting of the car and plow relative to each other about the longitudinal axis of the car and plow. The construction described also provides an automatic adjustment of the plow to various bumper heights since, as the rear end of the A-frame is raised to bumper height the moldboards swing inwardly symmetrically while preserving the arrangement of thrust above described, the moldboards maintaining a vertical position.

When upward movement is imparted to one of the moldboards as by passing over a stone, or by riding up a banking, such movement is accomplished without any tendency to tilt the car to which the plow is attached, the upward movement of one moldboard is accompanied by a tipping of the other moldboard through the linkages and the pin connections at the forward end of the A-frame. The distribution of thrusts in the system remains substantially unchanged. Direct snow pressure from the sides with its tendency to move the moldboards inwardly about the nose hinge is resisted by the weight of the car, since such inward movement exerts an upward thrust on the bumper.

The tightness of the connections between the frame members, links and moldboards is not critical at any point of operation so that substantial manufacturing tolerances are permissible. Since the arrangement of parts and the character of their movement maintains a substantially constant pattern of thrust distribution, none of the parts need to be made oversize to take an undue share of strain under changing conditions of operation, the result being an extremely light plow which may be easily handled when the parts are disassembled.

In Figs. 3, 4, 7 and 8 is shown a modified structure in which, for the linkage arrangement previously described, a "parallel" form of linkage is substituted. The moldboards 45 may be exactly similar to moldboards 10 and include bottom runners 46 and a shoe 47. The forward ends of the moldboards are hinged together by hinge plates 48—49 and removable hinge pin 50. Side members 51 of an A-frame are provided at their forward ends with openings to permit them to be slipped over pins 52 welded to the runners of the moldboard. Members 51 are connected together adjacent their rear ends by a cross member 53 and the end portions 54 of members 51 are bent outwardly to provide for the attachment of angles 22 and the bumper clamps as previously described.

Approximately two-thirds of its length from the front end, each moldboard is provided with a pair of vertical angle irons 55 welded to the inner face of the moldboard and providing brackets in which the ends of a pair of parallel links 56 are pivoted. The other ends of the links 56 are pivoted in brackets 57 welded to the ends of short angle irons 58 welded one to each member 51 at the juncture of the latter members with the cross member 53. The connection of the parallel links to brackets 57 is by removable pivot pins 59.

The plow of this second form adjusts itself to varying heights of the bumper of the car to which it is attached in the same general manner as the first form and the forward thrust of the car is similarly carried to the bottom of the moldboards adjacent their hinged ends. In this form the pivotal connections are all made sufficiently loose to provide a small degree of universal movement since the links 56 move slightly out of parallel as the A-frame is moved upwardly as shown in Fig. 7, or when one moldboard is lifted as shown in Fig. 8.

I claim:

1. A plow for attachment to the bumper of an automobile which comprises a pair of moldboards hinged together at their forward ends for swinging movement about a vertical axis, a triangular frame for transmitting thrust from the car bumper to the plow, said frame including a pair of side members pivotally connected one to each moldboard adjacent said hinge and at the lower edge portion of the moldboard for swinging movement in a vertical plane, and links connecting the moldboards to the side members, said links being positioned to transmit thrust from the side members downwardly to the moldboards when the rear ends of the members are raised to bumper height.

2. A plow for attachment to the bumper of an automobile which comprises a pair of moldboards hinged together at their forward ends for swinging movement about a vertical axis, a triangular frame for transmitting thrust from the car bumper to the plow, said frame including a pair of side members having their forward ends pivotally connected one to each moldboard adjacent said hinge and the lower edge of the moldboard for swinging movement in a vertical plane, and links connecting the side member to the moldboard to cause the moldboards to swing symmetrically inward as the rear ends of the side members are raised.

3. A plow for attachment to the bumper of an automobile which comprises a pair of moldboards hinged together at their forward ends for swinging movement about a vertical axis, a triangular frame for transmitting thrust from the car bumper to the plow, said frame including a pair of side members having their forward ends pivotally connected one to each moldboard adjacent said hinge and the lower edge of the moldboard for swinging movement in a vertical plane, and links connecting the side members to the moldboard to cause the moldboards to swing symmetrically inward as the rear ends of the side members are raised, said links being positioned to transmit thrust from the side members downwardly to the moldboards when the rear ends of the side members are at bumper height.

4. A snow plow for attachment to the bumper of an automobile which comprises a pair of moldboards hinged together at their forward ends for swinging movement about a vertical axis, a triangular frame for transmitting thrust from the car bumper to the plow, said frame including a pair of side members pivotally connected at their forward ends, one to each moldboard at points adjacent said hinge and the lower edges of the moldboards, a pair of links pivotally connected at their outer ends, one to each moldboard adjacent the upper edge thereof, the inner ends of said links being pivotally connected one to each of said members, a second pair of links pivotally connected at their outer ends, one to each moldboard adjacent the lower edge thereof, the inner ends of said second pair of links being pivotally connected one to each of said side members, and means for releasably and pivotally clamping the rear ends of the side members to the car bumper for swinging movement in a vertical plane.

5. A snow plow for attachment to the bumper of an automobile which comprises a pair of moldboards connected together at their forward ends by a vertically positioned removable hinge pin, a triangular frame for transmitting thrust from the car bumper to the plow, said frame including a pair of side members releasably pivoted at their forward ends one to the forward end of each moldboard adjacent the lower edge thereof, a pair of links pivotally connected at their outer ends, one to each moldboard adjacent the upper edge thereof, the inner ends of said links being releasably pivoted one to each of said side members, a second pair of links pivotally connected at their outer ends one to each moldboard adjacent the lower edge thereof, the inner ends of said second pair of links being releasably pivoted one to each of said side members, and means for releasably clamping the rear ends of the side members to the car bumper for swinging movement in a vertical plane.

6. A snow plow for attachment to the bumper of an automobile which comprises a pair of moldboards hinged together at their forward ends for swinging movement about a vertical axis, a triangular frame for transmitting thrust from the car bumper to the plow, said frame including a pair of side members pivotally connected at their forward ends, one to each moldboard adjacent said hinge, a pair of links pivotally connected at their outer ends, one to each moldboard adjacent the upper edge thereof, a second pair of links pivotally connected at their outer ends, one to each moldboard adjacent the lower edge thereof, the inner ends of the links of one pair being pivotally connected to the adjacent side members and the inner ends of the links of the other pair being pivotally connected to the non-adjacent side members.

7. A snow plow for attachment to the bumper of an automobile which comprises a pair of moldboards hinged together at their forward ends for swinging movement about a vertical axis, a triangular frame for transmitting thrust from the car bumper to the plow, said frame including a pair of side members pivotally connected at their forward ends, one to each moldboard, at points adjacent said hinge and the lower edges of the moldboards, a pair of links pivotally connected at their outer ends, one to each moldboard adjacent the upper edge thereof, the inner end of each of said links being pivotally connected to the adjacent side member, a second pair of links pivotally connected at their outer ends one to each moldboard adjacent to the lower edge thereof, the inner end of each of said second pair of links being pivotally connected to the non-adjacent side member.

ROLAND B. BOURNE.